United States Patent [19]

Mathews et al.

[11] 4,333,170

[45] Jun. 1, 1982

[54] ACOUSTICAL DETECTION AND TRACKING SYSTEM

[75] Inventors: Lemuel P. Mathews, Rancho Palos Verdes; Charles A. Lohman, Fullerton; Paul R. Armstrong, Yorba Linda, all of Calif.

[73] Assignee: Northrop Corporation, Los Angeles, Calif.

[21] Appl. No.: 853,207

[22] Filed: Nov. 21, 1977

[51] Int. Cl.³ .............................................. G01S 3/80
[52] U.S. Cl. ..................................... 367/125; 367/122
[58] Field of Search ................... 340/6 R, 16 R, 16 P; 367/125, 127, 122

[56] References Cited

U.S. PATENT DOCUMENTS

| | | | |
|---|---|---|---|
| 3,383,651 | 5/1968 | Koblick | 367/127 |
| 3,723,960 | 3/1973 | Harris | 367/127 |
| 3,864,666 | 2/1975 | Douglas | 367/126 |
| 4,017,859 | 4/1977 | Medwin | 367/125 |

*Primary Examiner*—Richard A. Farley
*Attorney, Agent, or Firm*—Edward A. Sokolski

[57] ABSTRACT

A plurality of acoustical transducers such as microphones are placed in appropriate array so that they are capable of detecting sonic energy emanating from an acoustical source such as an aircraft or a ground vehicle. The outputs of the transducers are sequentially sampled and multiplexed together, the time multiplexed signals then being converted from analog to digital form in an analog/digital converter. The output of the analog/digital converter is fed to a fast Fourier transformer (FFT), which transforms these signals to Fourier transform coefficients represented as real and imaginary (cosine and sine) components. The output of the fast Fourier transformer is fed to a digital processor. In this processor, the power and phase of each frequency bin for each microphone output is determined and the phase differences between signals received by pairs of microphones for each frequency bin of interest are determined. Each of these phase difference signals is divided by the frequency of their associated bin to provide a "phase difference slope" for each frequency bin and for each microphone pair. Signals received by any pair of microphones from the same target (regardless of frequency) have a common phase difference slope. The processor groups all common phase difference slopes together, these individual phase difference slopes each identifying a separate target. The phase difference slopes for each target are used to compute the direction of that target. By using two pairs of microphones in a mutually orthogonal array, target direction in both azimuth and elevation can be computed.

13 Claims, 14 Drawing Figures

| MICROPHONE | SAMPLE NO. | VOLTS CONVERTED TO BINARY DIGITAL NUMBER |
|---|---|---|
| 1 | 1 | 0 0 0 1 0 1 1 0 1 0 0 1 0 1 0 0 |
| 2 | 1 | 0 0 0 1 1 1 1 0 0 1 0 0 1 0 0 0 |
| 3 | 1 | 1 0 0 0 0 0 1 0 1 1 1 0 0 1 0 0 |
| 4 | 1 | 1 0 1 0 0 1 1 0 0 1 1 1 0 0 0 0 |
| 1 | 2 | 0 0 1 0 1 1 0 0 1 0 1 1 1 0 0 0 |
| 2 | 2 | 0 1 0 0 0 1 1 1 0 0 1 0 1 0 0 0 |
| 3 | 2 | 0 0 0 1 0 1 0 0 1 0 1 0 0 1 0 0 |
| 4 | 2 | 0 0 0 0 0 0 0 0 1 0 1 1 0 1 0 0 |

FIG. 7A

| MICROPHONE | FREQ. BIN | MEMORY LOCATION | REAL FFT VALUE IN BINARY DIGITAL FORM |
|---|---|---|---|
| 1 | 0 | 255 | 1 0 0 1 0 0 1 0 1 1 1 0 0 0 0 0 |
| 1 | 1 | 254 | 1 0 0 0 1 0 0 1 1 0 0 0 0 1 1 1 |
| 2 | 0 | 511 | 0 0 0 1 0 1 0 0 1 1 0 0 1 0 1 0 |
| 2 | 1 | 510 | 1 0 0 0 1 1 1 0 0 1 0 1 0 0 0 0 |
| 3 | 0 | 767 | 0 0 0 1 0 1 1 0 0 1 1 0 0 0 1 0 |
| 3 | 1 | 766 | 1 0 0 0 1 0 0 0 0 1 1 1 0 0 1 0 |
| 4 | 0 | 1023 | 1 0 0 1 0 0 0 1 1 0 1 1 0 1 1 0 |
| 4 | 1 | 1022 | 0 0 0 0 1 0 0 1 0 1 0 0 0 0 1 1 |

FIG. 7B

| MICROPHONE | FREQ. BIN | MEMORY LOCATION | IMAG. FFT VALUE IN BINARY DIGITAL FORM |
|---|---|---|---|
| 1 | 0 | 255 | 0 0 0 1 0 1 0 1 1 1 0 0 0 1 0 0 |
| 1 | 1 | 254 | 1 0 0 0 1 0 1 0 0 1 0 1 0 1 1 1 |
| 2 | 0 | 511 | 1 0 0 1 1 1 0 1 0 1 0 0 0 1 1 0 |
| 2 | 1 | 510 | 1 0 0 0 0 0 1 0 1 0 1 0 0 0 0 0 |
| 3 | 0 | 767 | 0 0 0 1 0 0 1 1 0 1 1 0 0 0 1 1 |
| 3 | 1 | 766 | 1 0 0 0 0 1 1 1 0 1 0 0 0 1 1 0 |
| 4 | 0 | 1023 | 0 0 0 1 0 1 1 1 0 1 0 0 0 1 0 1 |
| 4 | 1 | 1022 | 0 0 0 0 0 1 0 0 1 0 0 1 0 0 1 0 |

FIG. 7C

ACOUSTICAL DETECTION AND TRACKING SYSTEM

This invention relates to the passive detection and tracking of targets which radiate acoustical energy, and more particularly to such a system which performs these functions by digital processing techniques.

The passive detection and tracking of targets such as aircraft and ground vehicles which emit acoustical energy, has a number of advantages over active sounding and radar systems. First, passive systems do not radiate a signal which can be used to indicate the presence as well as the location and identity of the tracking station. Further, active detection and tracking systems are subject to the reception of false "echoes" by virtue of multiple reflections. Also, active tracking systems are more subject to counter measures than passive systems, which can completely obviate their effectiveness.

Prior art passive acoustical detection and tracking systems are described in the following U.S. Pat. No. 3,736,553 issued May 29, 1973 to Kermode; No. 3,626,365 issued Dec. 7, 1971 to Press; No. 3,622,964 issued Nov. 23, 1971 to Leisterer; No. 3,501,740 issued May 17, 1970 to Parkin; No. 3,430,233 issued Feb. 25, 1969 to Christensson; No. 3,713,087 issued Jan. 23, 1973 to Bauer et al; No. 3,859,621 issued Jan. 7, 1975 to Foreman; No. 3,854,117 issued Dec. 10, 1974 to Fothergill; No. 3,564,493 issued Feb. 16, 1971 to Hicklin; No. 3,714,620 issued Jan. 30, 1973 to Biren et al; and No. 3,723,960 issued Mar. 27, 1973 to Harris.

A number of these prior art systems such as, for example, that described in the aforementioned patent to Foreman, employ a plurality of microphones which are arranged in an array such that the bearing of a target can be determined by a comparison between the time of arrival of the signals from that target at the various microphones. There are no means provided in such systems, however, for positively assuring that the signals being detected have in fact all emanated from the same target. Thus, if there are a plurality of targets in the same general location, all generating signals at approximately the same frequency, it is difficult with such prior art systems to discriminate one target from another. Techniques employed in the aforementioned prior art for discriminating between various targets, as for example described in the patents to Hicklin and Biren, generally involve the use of wide band filters which enable the discrimination between signals arriving from various targets by virtue of their frequency components. This approach, however, is ineffective in discriminating between targets of the same general type which radiate energy in the same frequency spectrum.

The system of the present invention provides an acoustical detection and tracking system which overcomes the aforementioned shortcomings of the prior art in that it enables the positive identification and grouping of signals emanating from a common target such that errors in tracking targets can be minimized. Further, in view of the accurate grouping of all signals emanating from a particular target provided in the system of the present invention, it is possible to identify targets by virtue of a characteristic frequency pattern in their acoustical energy. The system of the invention generates information as to elevation and azimuth of the identified target to enable the tracking thereof by means of digital processing which can be performed in a special or general purpose digital computer.

It is therefore an object of this invention to provide a passive acoustical detection and tracking system having the capability of accurately discriminating between targets as well as determining their individual directions.

It is a further object of this invention to provide an improved acoustical detection and tracking system employing highly accurate digital processing in its implementation.

Other objects of this invention will become apparent as the description proceeds in connection with the accompanying drawings, of which:

FIGS. 7A–7C are a series of graphical illustrations showing various digital signals generated in the system of the invention.

Briefly described, the system of the invention is as follows: Acoustical transducers such as microphones are arranged in an array so as to receive acoustical signals from targets generating acoustical energy. Pairs of the microphones are arranged in a mutually orthogonal relationship to enable the generation of information as to the azimuth and elevation of the target by virtue of the phase difference between signals received by each of the paired microphones. The outputs of the microphones are sequentially sampled and these sampled signals are time multiplexed, the time multiplexed signals then being converted from analog to digital form in analog/digital converter. The output of the analog/digital converter is fed to a fast Fourier transformer (FFT) which transforms the signals into Fourier transform coefficients broken down into real and imaginary components so that phase information on each of the frequency bins is retained. The output of the fast Fourier transformer is fed to a digital processor, which first computes the power and phase angle for each frequency bin for each microphone, and then determines from the power level of the frequency bins which of these contain signal data of interest and which do not, so that the frequency bins of interest can be separated out. Then the phase differences between frequency bins of interest from pairs of microphones are computed. These phase differences are then divided by the frequency associated with their bins, thereby determining the phase difference slope for each frequency bin. Signals having common phase difference slopes are then grouped together, these common slopes indicating signals originating at common targets. The azimuth and elevation of each target can then be computed from the phase difference slopes for the paired azimuth and elevation microphones respectively.

Figure 1:
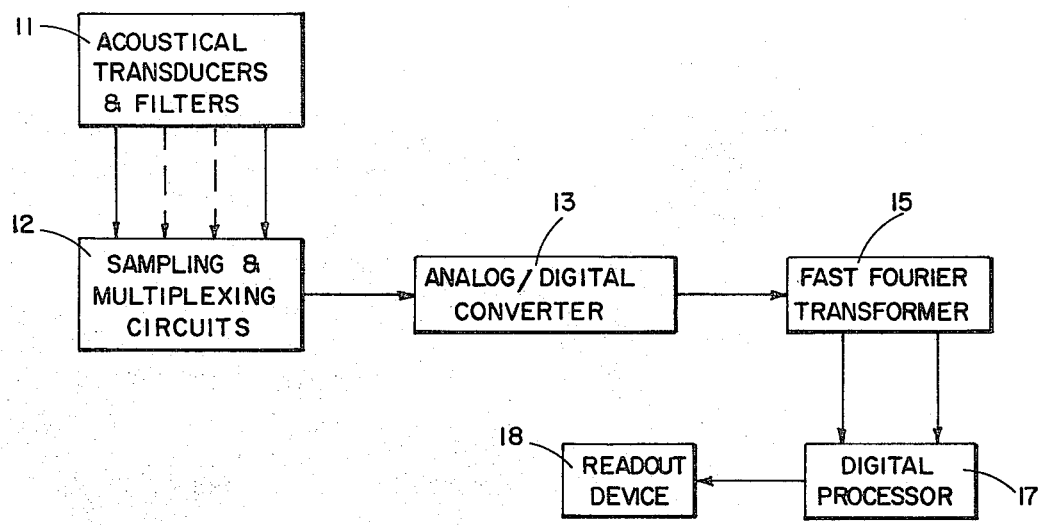
FIG. 1 is a block diagram showing the basic components of the system of the invention.

Referring now to FIG. 1, a functional block diagram of the system of the invention is shown. Acoustical signals are received by acoustical transducers and filters 11. The transducers may comprise an array of microphones arranged in pairs so as to be capable of providing information as to the azimuth and elevation of targets, as shown for example in FIG. 3. Band pass filtering is accomplished to eliminate noise and other signals which are not of interest. The signals are then fed to sampling and multiplexing circuits 12. The outputs of the microphones are sequentially sampled in the sampling portion of the circuit and these outputs are then time multiplexed together to form a composite signal including outputs from all microphones. The signal is then converted from analog to digital form in analog/digital converter 13. The output of analog/digital converter 13 is fed to fast Fourier transformer 15 which operates in accordance with an appropriate algorithm, such as the one cited further on in the specification. The fast Fourier transform transforms the signal into real and imaginary Fourier coefficients for each frequency bin and for each microphone. The real and imaginary Fourier coefficients are fed to digital processor 17 which operates to compute the phase differences between the signals received by pairs of microphones for each frequency bin, these phase difference signals being divided by the frequency bin of the associated bin to provide a phase difference slope for each such signal. Signals having common phase difference slopes are then grouped together, each of these groups representing signals emanating from a common target. The magnitudes of the slopes for signals obtained from a pair of "azimuth" microphones provide information as to the azimuth of the target and signals from a pair of "elevation" microphones provide information as to target elevation. The elevation microphones can be placed ahead of the azimuth microphones so that the target direction ahead or behind can be resolved by comparing one elevation microphone to the azimuth microphone data. Information as to azimuth, elevation and the frequencies of signals emanated by each target is fed to readout device 18.

Figure 2:
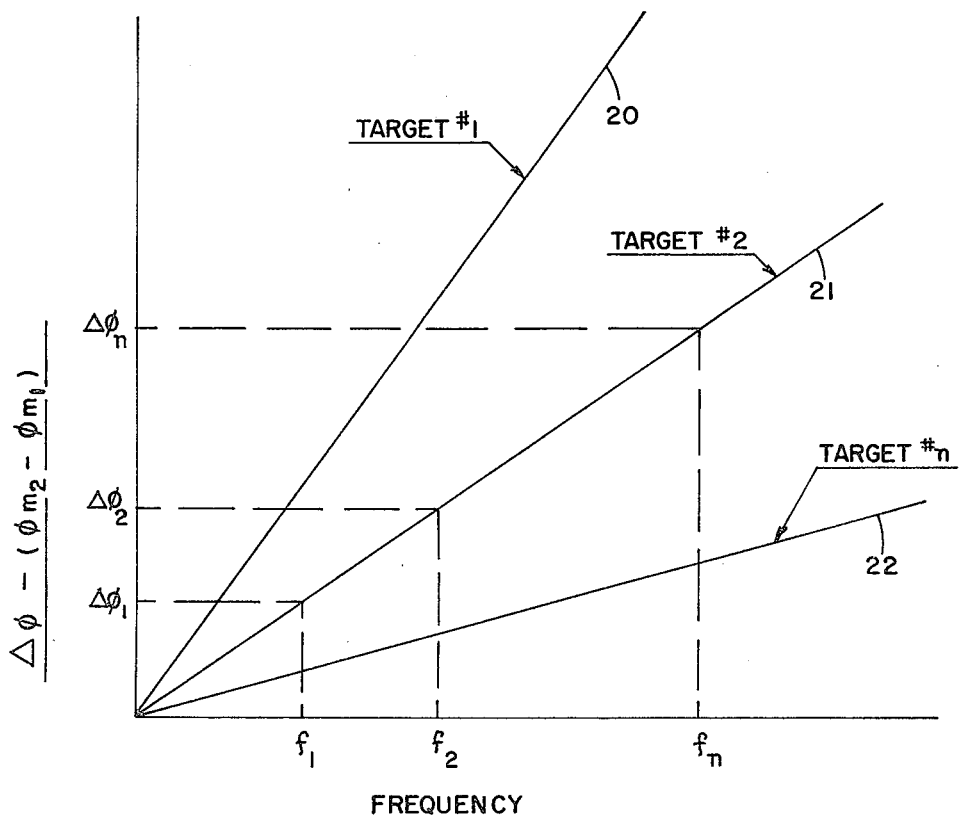
FIG. 2 is a graphic illustration of the generation of the phase slope difference in the system of the invention.

Referring now to FIG. 2, the operation of the system of the invention in identifying targets is graphically illustrated. It can be shown that:

$$\frac{\phi f_1 m_2 - \phi f_1 m_1}{f_1} = \frac{\phi f_2 m_2 - \phi f_2 m_1}{f_2} = \frac{\phi f_n m_2 - \phi f_n m_1}{f_n} \quad (1)$$

where:
$\phi f_1 m_2$ = phase of $f_1$ at microphone #2 of a pair of microphones, $m_1$ and $m_2$
$\phi f_1 m_1$ = phase of $f_1$ at microphone #1 of the pair
$\phi f_2 m_2$ = phase of $f_2$ at microphone #2
$\phi f_2 m_1$ = phase of $f_2$ at microphone #1
$\phi f_n m_2$ = phase of $f_n$ at microphone #2
$\phi f_n m_1$ = phase of $f_n$ at microphone #1
$f_1, f_2-f_n$ are frequencies of signals emanating from a common target.

Thus as graphically illustrated in FIG. 2, phase difference slope lines 20-22 each represent a common phase difference slope for all signals emanating from a particular target, regardless of the frequencies of such signals. Thus, slope line 20 represents signals from a first target, slope line 21 signals from a second target, and slope line 22 signals from an "nth" target. This characteristic phase difference slope condition is employed in the system of the invention for identifying and grouping signals from a common target. These signals can be grouped and their phase difference slope characteristics used to compute the azimuth and elevation of each target which information can be further used to track the target. Also, the frequency composition of the grouped signals can be used to identify the target by virtue of the known characteristic frequency compositions of signals generated by various types of targets.

Figure 3:
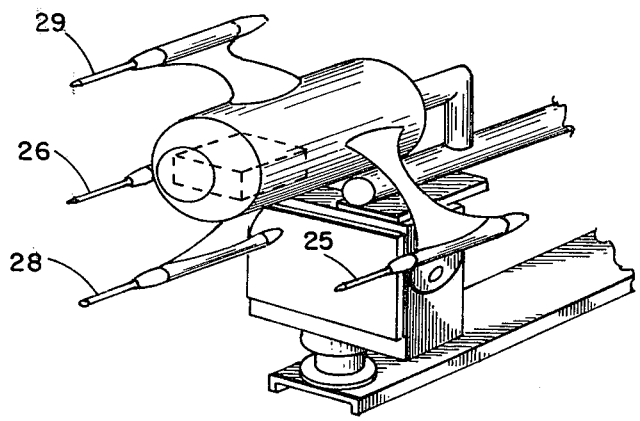
FIG. 3 is a pictorial view of a microphone array which may be utilized in the system of the invention.

Referring now to FIG. 3, a typical microphone array that can be utilized in the system of the invention is illustrated. A first pair of microphones 25 and 26 are mounted in spaced relationship along a horizontal axis to provide azimuth information, while a second pair of microphones 28 and 29 are mounted along a vertical axis substantially normal to and forward of that for the first pair, so as to provide elevation information. The microphones may be of either the condenser or piezoelectric type wherein phase delay as a function of frequency and wave front direction is essentially the same for each microphone. Microphone sensitivity, dynamic range and phase accuracy requirements may vary with the particular application requirements at hand. Spacing between the pairs of microphones is typically 15 to 36 inches.

Figure 6A:
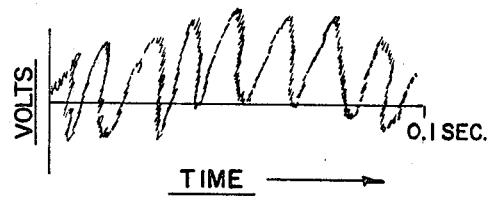
FIGS. 6A–6F are a series of waveform diagrams illustrating signals generated in the system of the invention.
Figure 6B:
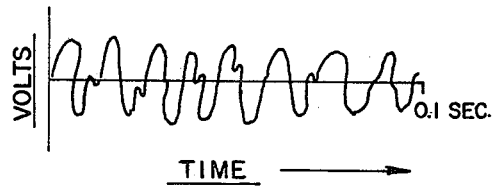

Referring now to FIGS. 4, 6A-6F and 7A, a preferred embodiment of the transducer, filtering, multiplexing and analog to digital conversion circuitry of the system of the invention along with waveform diagrams pertinent thereto are shown. Microphones 25-29 receive signals which are amplified in amplifiers 35-38 respectively. Amplifiers 35-38 have automatic gain control circuits incorporated therein. The outputs of amplifiers 35-38 are illustrated in FIG. 6A and generally have frequency components therein from 5 Hz to 20 kHz, with the dominant portions being of the order of 30-250 hertz. The outputs of amplifiers 35-38 are fed to respective band pass filters 39-42, which operate to filter out the low frequency and high frequency components of the signals, leaving signals between 10 and 250 hertz as illustrated in FIG. 6B. Such filtering is directed principally to eliminate wind induced noise at the low frequencies and aliasing inputs at the high frequencies, and also eliminate other frequencies which are not of interest.

Figure 6C:
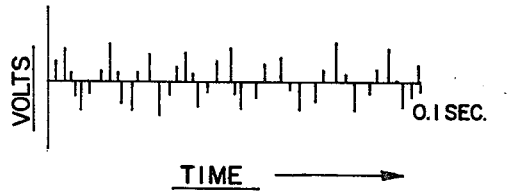
Figure 6D:
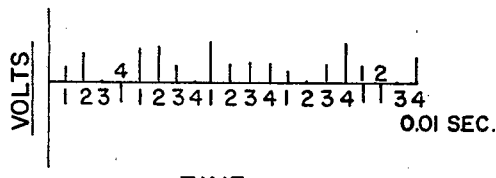

The outputs of filters 39-42 are fed to sample-hold circuits 44-47 respectively. The sample-hold circuits operate in response to sampling timing control 50 which may be timed by a 512 hertz clock signal. Sampling timing control 50 is also used to control the operation of multiplexer 52, which time multiplexes the outputs of the sample-hold circuits. The sample-hold circuits are simultaneously placed in a "hold" mode, while multiplexer 52 sequences through all four of the sample-hold outputs while the signals are being digitized in the analog to digital converter. When the last output has been digitized, the sample-holds are placed back in the sample mode. The outputs of the sample-hold circuits are illustrated in FIG. 6C, while the output of the multiplexer is shown in FIG. 6D.

Figure 6E:
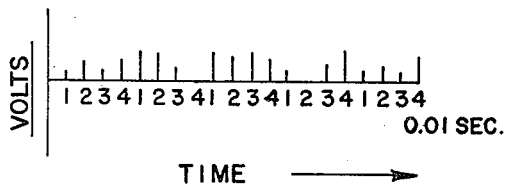
Figure 6F:
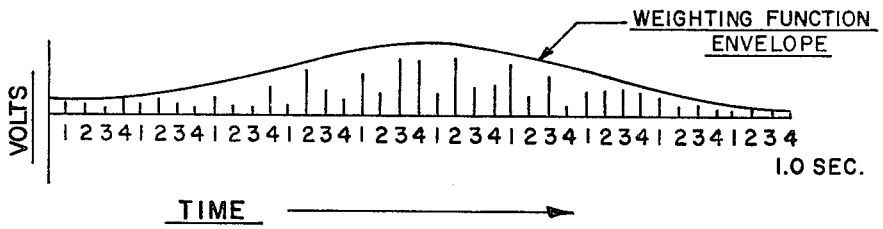

The output of multiplexer 52 is fed to absolute value amplifier 53, which operates to effectively flip over all the negative portions of the signals to produce a unipolar output, as shown in FIG. 6E. A "sign" signal is fed to multiplexer 60 to indicate negative values when they appear. The output of amplifier 53 is fed to digital/analog multiplier 54. Multiplier 54 receives a weighting function from ROM 56, this ROM operating in response to counter 57 which in turn responds to sampling timing control 50. Multiplier 54 provides Hamming function weighting to the input samples. This type of programmed weighting as is well known in the art builds up the amplitude of the signals near the midpoint of the timing interval which facilitates discrimination of the signals. This can be seen in FIG. 6F which shows the output of multiplier 54. The output of multiplier 54 is fed to analog/digital converter 58 which converts the signals to binary digital form as shown in FIG. 7A. The output of analog/digital converter 58 is fed to multiplexer 60 where the signals are time multiplexed ordered for storage in RAMs 73 and 74 in a manner suitable for processing in accordance with the FFT algorithm.

Figure 5:
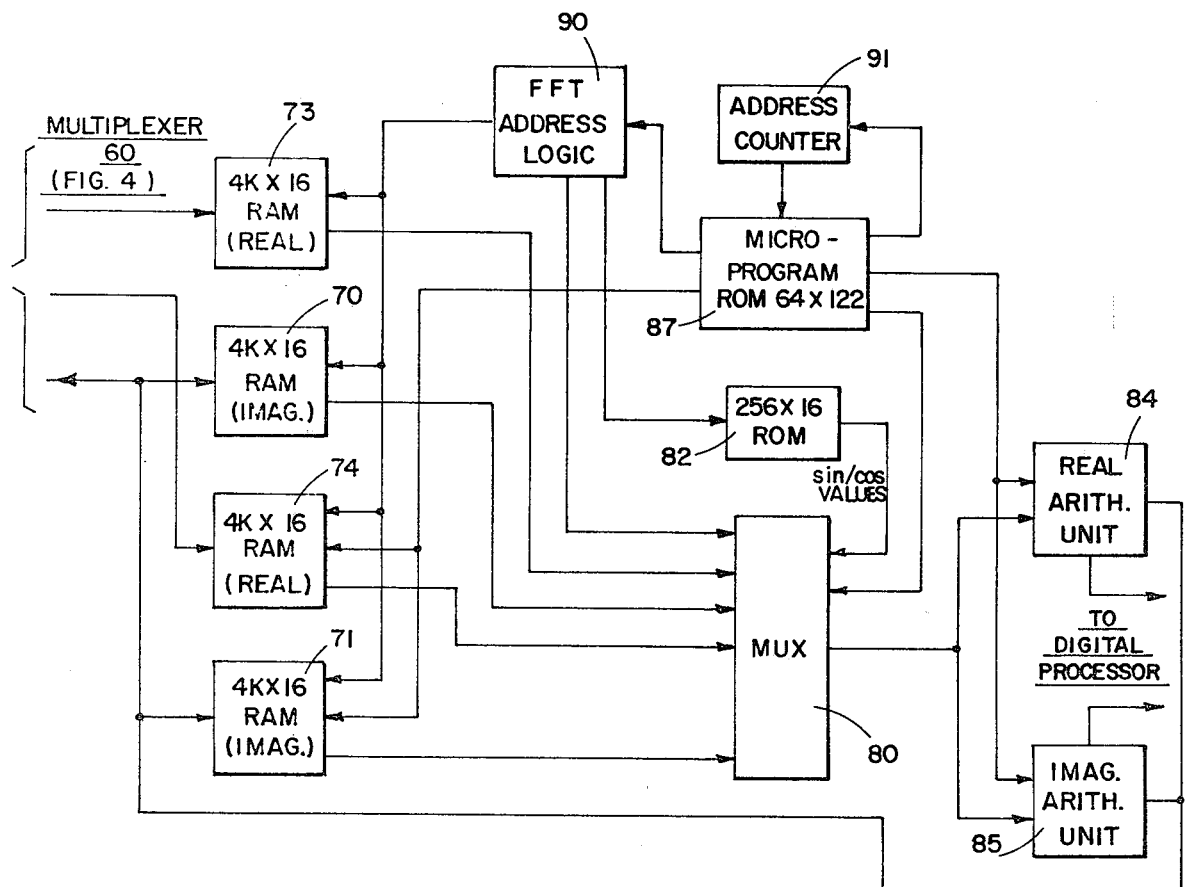
FIG. 5 is a functional block diagram illustrating the fast Fourier transformer of the preferred embodiment.
Figure 4:
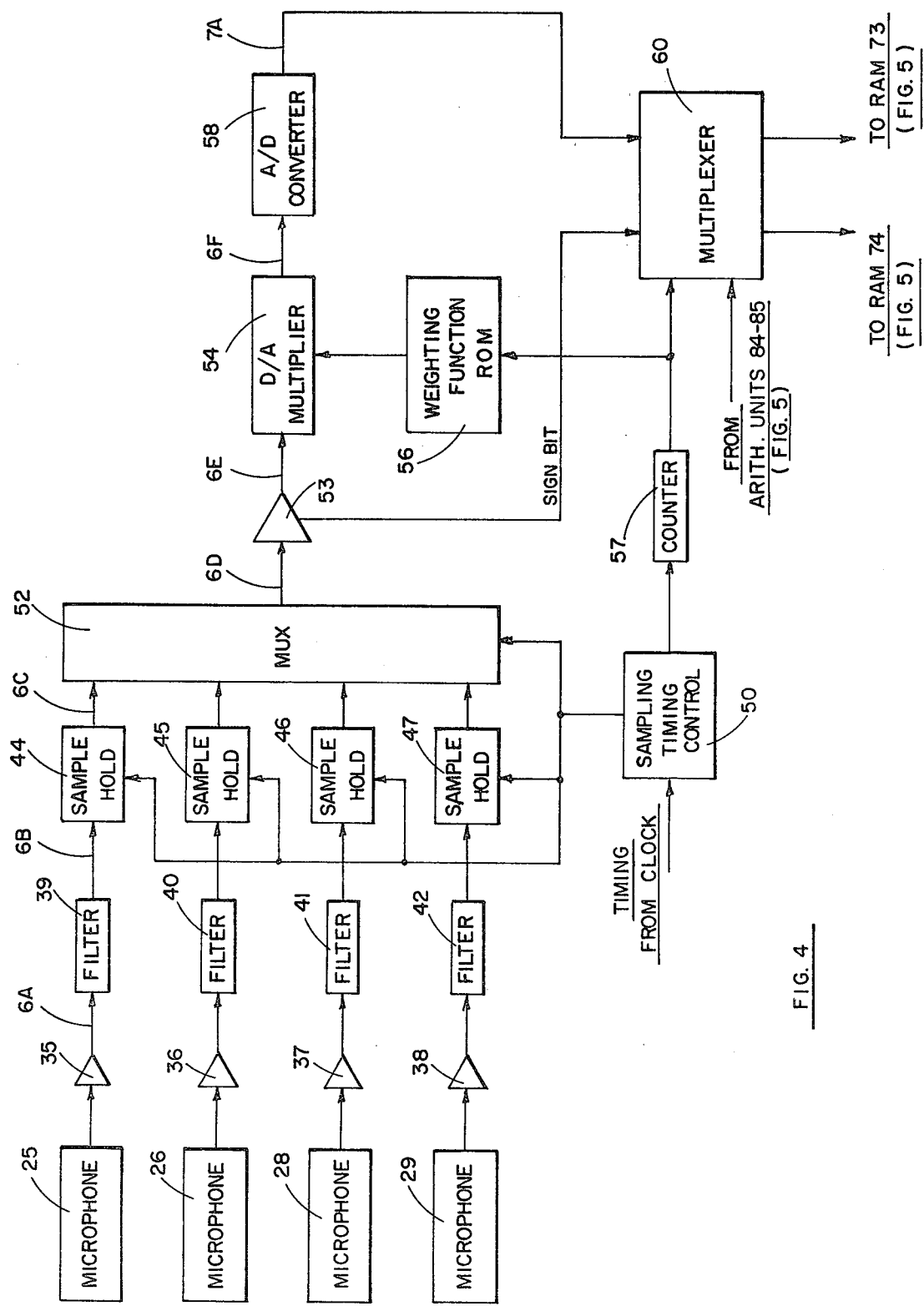
FIG. 4 is a functional block diagram illustrating a preferred embodiment of portions of the system of the invention involved with detection, multiplexing and converting the received signals from analog to digital form.

Referring now to FIG. 5, a fast Fourier transformer unit which may be used in the system of the invention is schematically illustrated. Outputs are alternately fed from multiplexer 60 (FIG. 4) to RAM 73 and RAM 74 of the transformer unit. RAMs 73 and 74 are used to hold all intermediate real values computed in each pass of the FFT process. Associated with these RAMs are RAMs 70 and 71 which are used to hold the computed imaginary values. During the "dumping" time, these last mentioned RAMs are loaded with all zeros. The outputs of RAMs 70, 71, or 73 and 74 are alternately fed to multiplexer 80. Also fed to multiplexer 80 is the output of ROM 82 which contains sine/cosine values for one quadrant. The multiplexed signals are fed from multiplexer 80 to real arithmetic unit 84 and imaginary arithmetic unit 85. Each arithmetic unit contains temporary storage registers, complementers, an adder and shift registers. By the use of proper control and timing signals, these arithmetic units perform all of the complex multiplications and additions required in the FFT operation. The control and timing instructions are supplied by high speed ROM 87 containing the "micro instructions" for the FFT operation. The operation of the FFT microprogram is such that while each arithmetic unit is processing data from one of the microphone channels, the computed data from the previous calculation is being stored back in memory and new data for the next calculation is being fetched from memory. Thus, the arithmetic units always proceed immediately from one calculation to the next and never have to wait for data from memory. The FFT address logic 90 operates in response to microprogram 87 to control the addressing of RAMs 79, 71, 73 and 74, and ROM 82. Associated with microprogram ROM 87 is address counter 91. The address counter 91 normally sequences the ROM to the next higher micro instruction with each clock pulse. However, certain of the ROM output bits are fed back to the address counter allowing the microprogram to conditionally jump anywhere in the micro instruction sequence. The fast Fourier transform unit operates in accordance with a conventional FFT algorithm which is contained in the programs of ROM 87 and ROM 82. A typical such algorithm which may be employed is described, for example, in *Digital Processing of Signals* by B. Gold and C. M. Rader, published by McGraw Hill, 1969. It is to be noted that the circuitry of FIG. 5 is only one of many implementations which may be utilized for computing the Fourier coefficients, and other circuits and techniques including the use of a general purpose computer, such as an IBM-370, may be employed if so desired. Typical final real and imaginary Fourier coefficient values residing in "real" random access memories 73, 74 and "imaginary" random access memories 70 and 71 are respectively shown in FIGS. 7B and 7C. As can be seen, these values are stored in binary digital form and represent the real and imaginary components of the microphone outputs for each microphone and for each frequency bin.

The Fourier coefficients are fed to a digital processor which may comprise a general purpose computer such as the IBM Model 370 wherein the signals are digitally processed. The following functions are sequentially performed in the computer:

1. Compute power of each frequency bin for each microphone.
2. Compute phase angle for each frequency bin for each microphone.
3. Determine which frequency bins may contain signal data of interest using the power level thereof as a criterion. Further, select which frequency bins will be processed by evaluating the power of the preselected frequency bins to the two adjacent bins on each side as well as comparing the bin power in one microphone to all microphones.
4. Compute phase difference between signals received by each microphone pair for selected frequency bins.
5. Compute phase difference slope for each frequency bin phase difference signal computed in (4).
6. Group phase difference slopes of similar values together.
7. Compute average phase slope.
8. Compute cone angle to target.
9. Calculate bearing and elevation to target.
10. Provide outputs for azimuth, elevation and frequency lines for each target.

The algorithm set forth below provides the programming information for implementing the above indicated functions, and, as noted, may be used in programming a general purpose digital computer to derive the desired outputs.

The system of this invention thus provides means for accurately detecting, tracking and identifying targets by virtue of the acoustical energy radiated by such targets, this end result being achieved by digital processing.

| DICTIONARY OF TERMS USED IN ALGORITHM | |
| --- | --- |
| AZIMUTH - | Bearing angle |
| BIN - | Current Fourier bin number |
| CHECK - | Calculated value used to check powers |
| CONFIG - | Configuration of sensors |
| CYCLES - | Cycles per second per Fourier bin |
| DELTA - | Fractional seconds between measurements |
| DIFF - | Current difference between phase angles |
| DVATE - | Allowable deviation in power between mikes |
| ELEVATION - | Elevation/Depression angle |
| FINI - | Finish time of data file info to be used |
| FFT - | Fast Fourier Transform Process (converts signal from time into frequency domain) |
| FREQ - | Current cycles per second value |
| FREQ L - | Lowest frequency of interest |
| FREQ H - | Highest frequency of interest |
| GROUP - | Phase difference grouping tolerance |
| HCONES (n) - | Array containing horizontal mike pair cone angles |
| HCPS(n) - | Array containing frequencies of Fourier bins selected in horizontal mike pair processing |
| HDIST - | Horizontal mike pair spacing distance |
| HFACTR - | Calculated horizontal mike pair spacing factor |
| HIBIN - | Highest Fourier bin number of interest |
| HINDEX(n,m) - | Array containing bin numbers selected |

| | DICTIONARY OF TERMS USED IN ALGORITHM | | | DICTIONARY OF TERMS USED IN ALGORITHM |
|---|---|---|---|---|
| | in horizontal mike pair slope grouping process | | NVGRPS - | involved in a vertical mike pair group Quantity of vertical mike pair groups |
| HLIMIT - | Calculated maximum value of valid slopes in the horizontal mike pair process | | NVSIGS - | Quantity of signals which passed power screening in vertical mike pair processing |
| HPWR(n) - | Array containing power values selected in horizontal mike pair direction processing | | POWER(n,m) - | Array containing calculated signal power for each bin and mike |
| HSLOPE(n) - | Array containing phase difference slopes selected in horizontal mike pair direction processing | | R - SCALE - | Temporary Real portion of complex value Calculated scalar |
| | | | SHLDR - | Required power roll-off between bins |
| HTOLER - | Calculated sine value of horizontal mike pair slope grouping tolerance | | SLOPE - START - | Current phase difference slope Starting time of data file info to be used |
| I - | Temporary Imaginary portion of complex value | | STEP - | Starting time increment between process iterations |
| LOBIN - | Lowest Fourier bin number of interest | | | |
| LOWER - | Lower bound of current slope group | | SUM - | Temporary accumulation of slope values |
| MATCHD(n,m) - | Array containing matched horizontal and vertical mike pair cone angle indices | | THETA(n,m) - | Array containing calculated signal phase angles for each bin and mike |
| | | | THRESH - | Minimum acceptable signal power |
| MAX BIN - | Current bin number containing MAXPWR | | UPPER - | Upper bound of current slope group |
| MAX PWR - | Current highest power value | | VCONES(m) - | Array containing vertical mike pair cone angles |
| MIKE - | Temporary index of mike numbers (Mikes 1 & 2 = horizontal, 3 & 4 = vertical) | | VCPS(n) - | Array containing frequencies of Fourier bins selected in vertical mike pair processing |
| NBINH - | Temporary index for horizontal mike pair bins | | VDIST - | Vertical mike pair spacing distance |
| NBINV - | Temporary index for vertical mike pair bins | | VFACTR - | Calculated vertical mike pair spacing factor |
| NGRPH - | Temporary index for horizontal mike pair groups | | VINDEX(m,m) - | Array containing bin numbers selected in vertical mike pair slope grouping process |
| NGRPV - | Temporary index for vertical mike pair groups | | VLIMIT - | Calculated maximum value of valid slopes in the vertical mike pair process |
| NHBINS(m) - | Array containing quantity of bins involved in a horizontal mike pair group | | VPWR (n) - | Array containing power values selected in vertical mike pair direction processing |
| NHGRPS - | Quantity of horizontal mike pair groups | | | |
| NHITS - | Quantity of matching frequencies between current horizontal and vertical cone angle groups | | VSLOPE(n) - | Array containing phase difference slopes selected in vertical mike pair direction processing |
| NHSIGS - | Quantity of signals which passed power screening in horizontal mike pair processing | | VTOLER - | Calculated sine value of vertical mike pair slope grouping tolerance |
| NPTS - | Quantity of measurements per mike | | X, Y - | Temporary values used during azimuth and elevation calculations |
| NVBINS(n) - | Array containing quantity of bins | | | |

<div align="center">ALGORITHM</div>

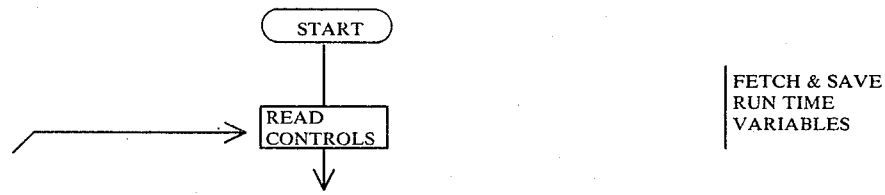

CØNFIG - Sensor configuration - airborne or ground
NPTS - Qty. measurements/mike (transform size)
DELTA - time increment between measurements
FREQL - Lowest frequency of interest
FREQH - Highest frequency of interest
START - Starting time of info from data file
STEP - Time increment between iterations
FINI - Ending time of iterative process
THRESH - Signal power threshold
SHLDR - Principal signal shoulder
DVATE - Signal power deviation
HDIST - Mike spacing - horizontal mike pair
VDIST - Mike spacing - vertical mike pair
GROUP - Phase difference slope grouping tolerance -continued
ALGORITHM
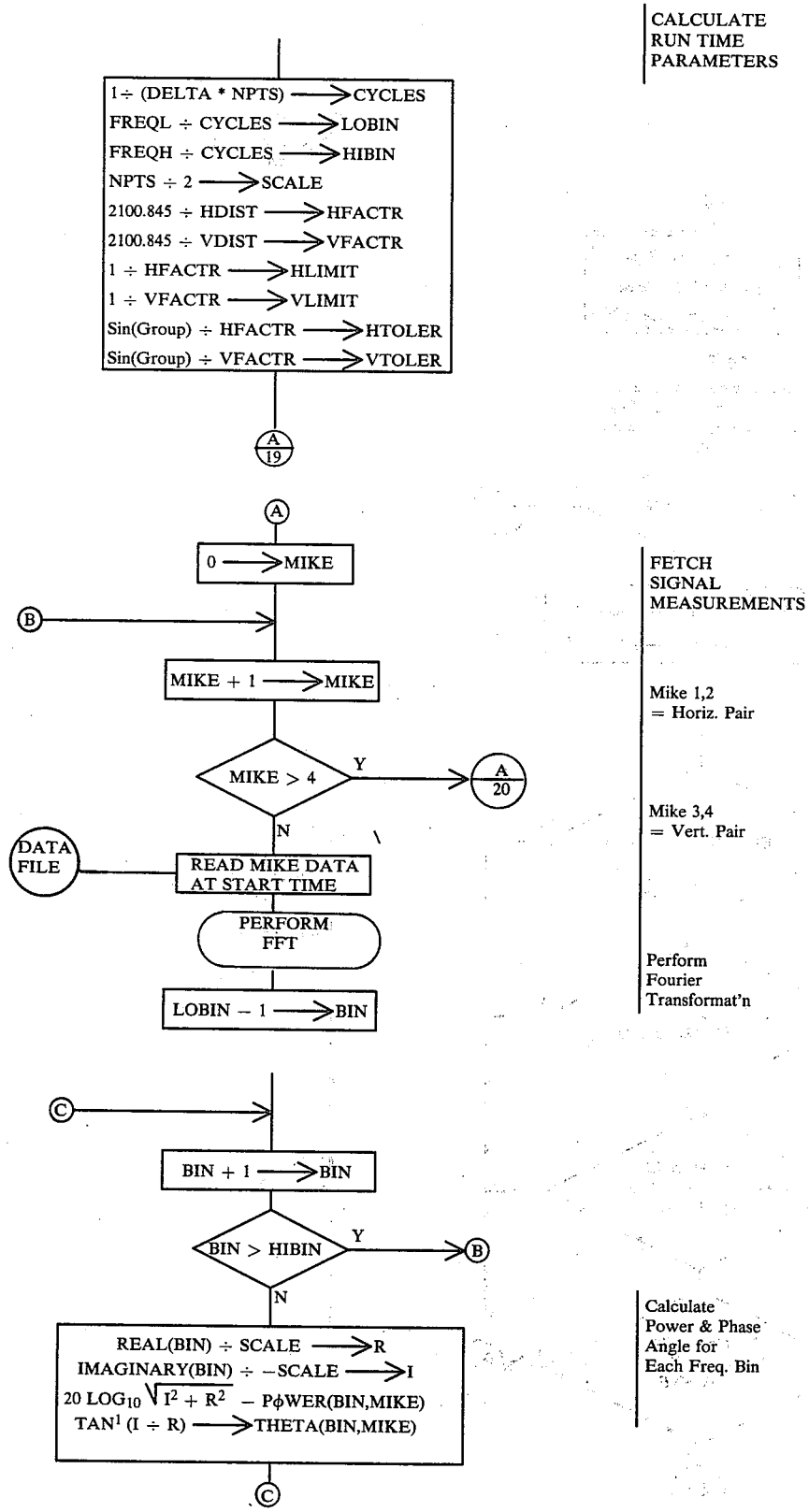

-continued
ALGORITHM
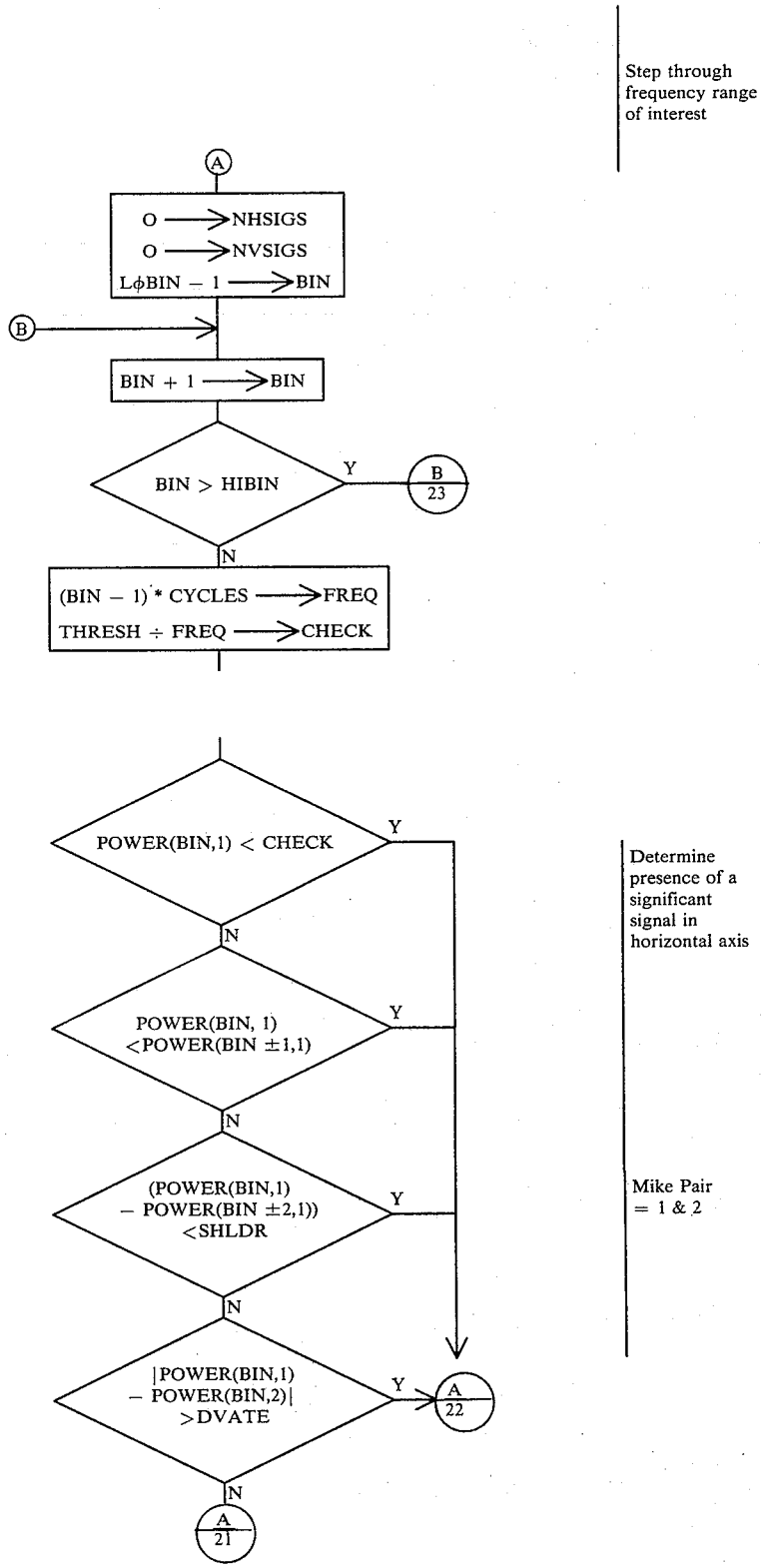

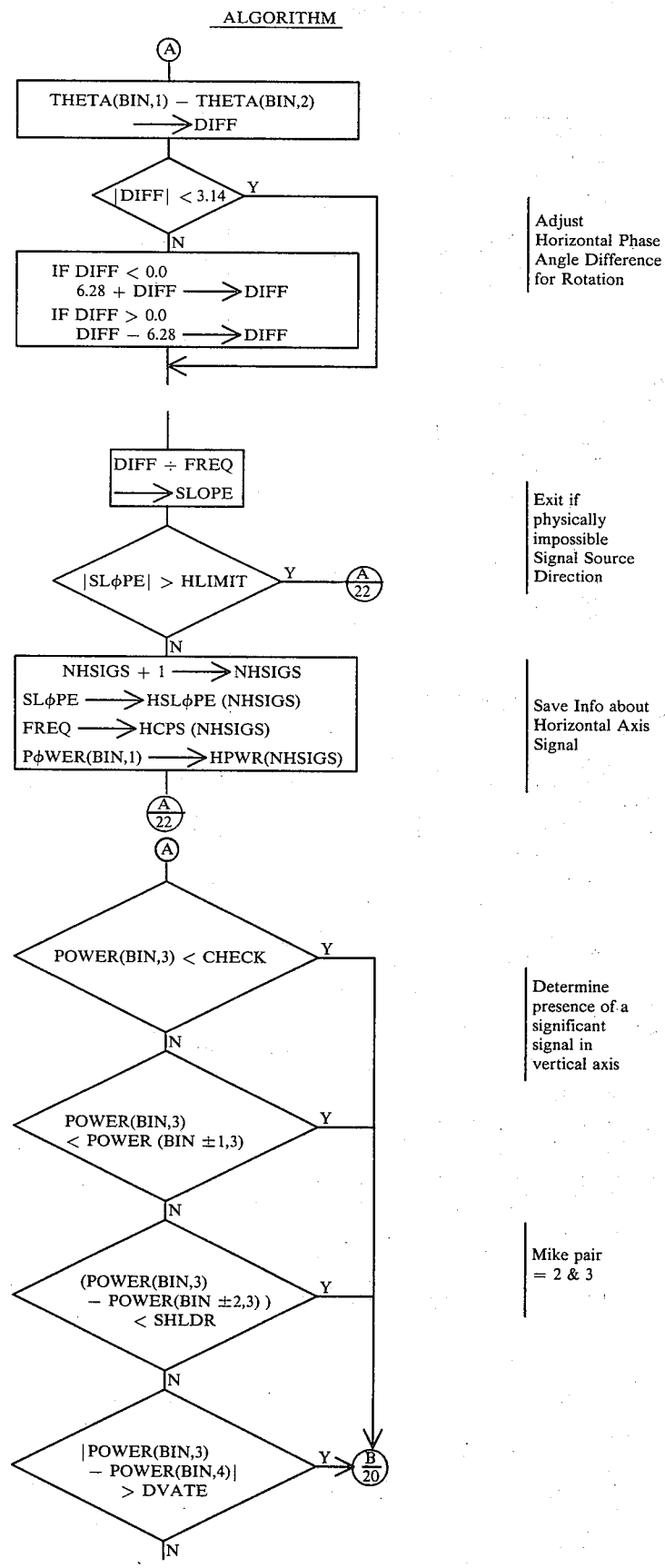

-continued
ALGORITHM
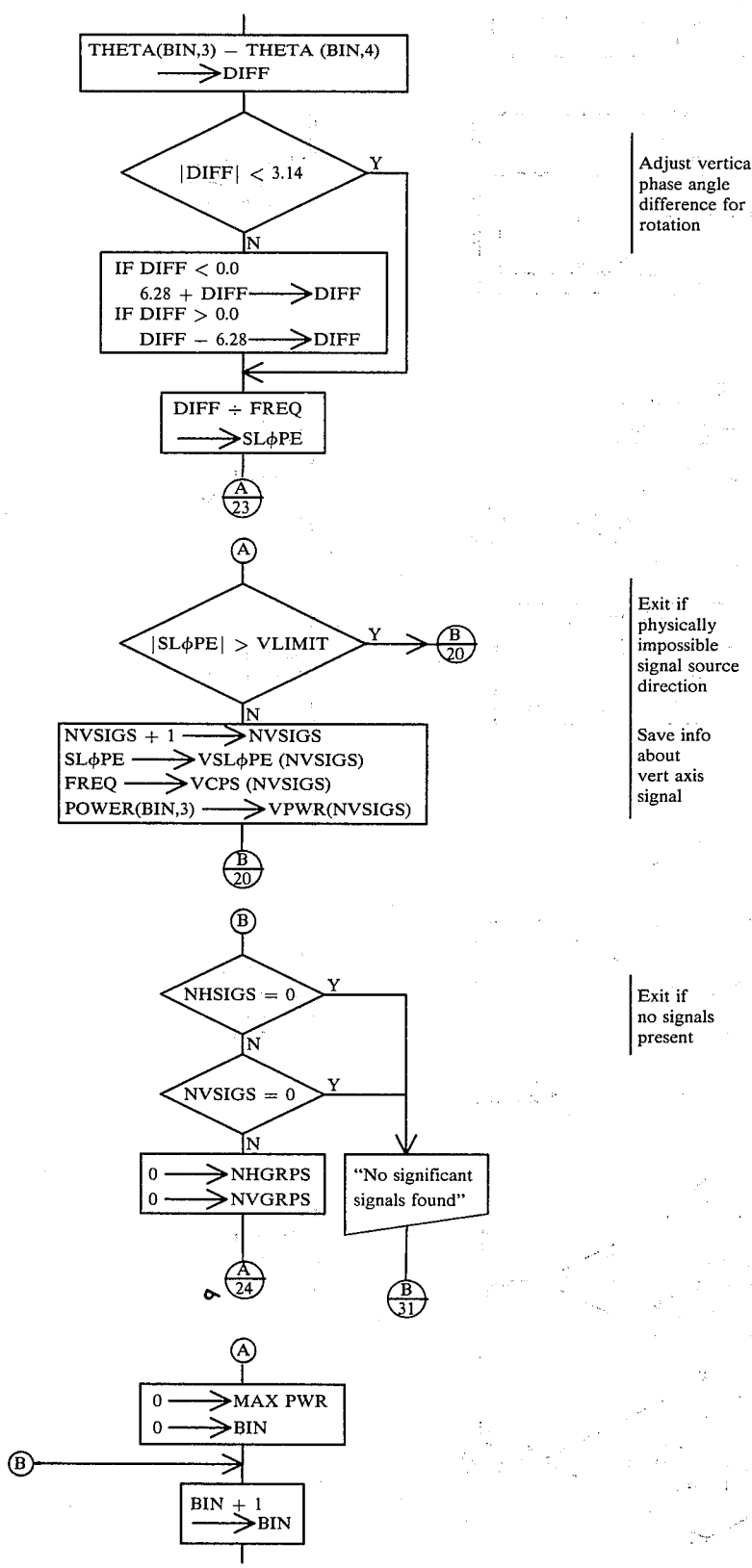

-continued
ALGORITHM
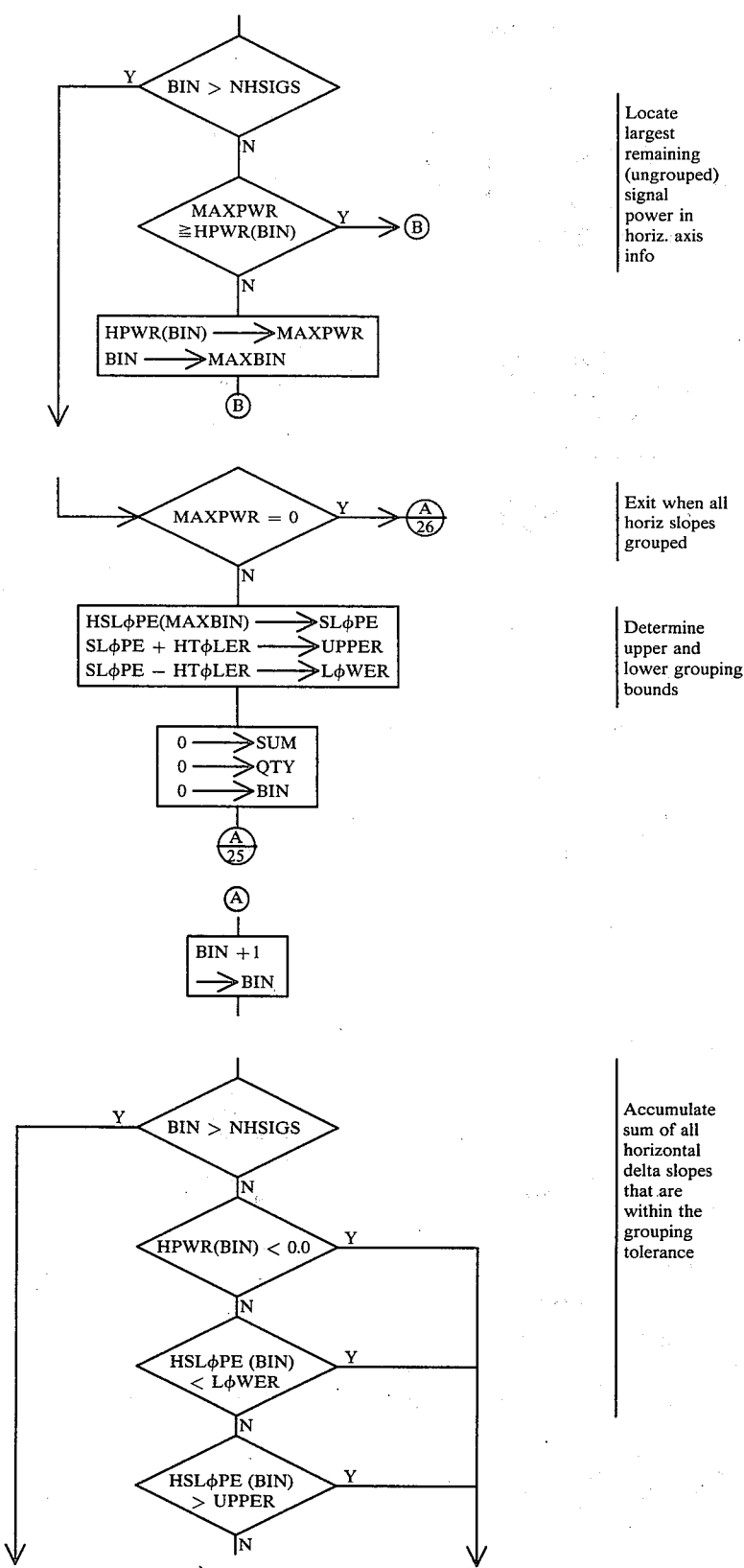

-continued
ALGORITHM
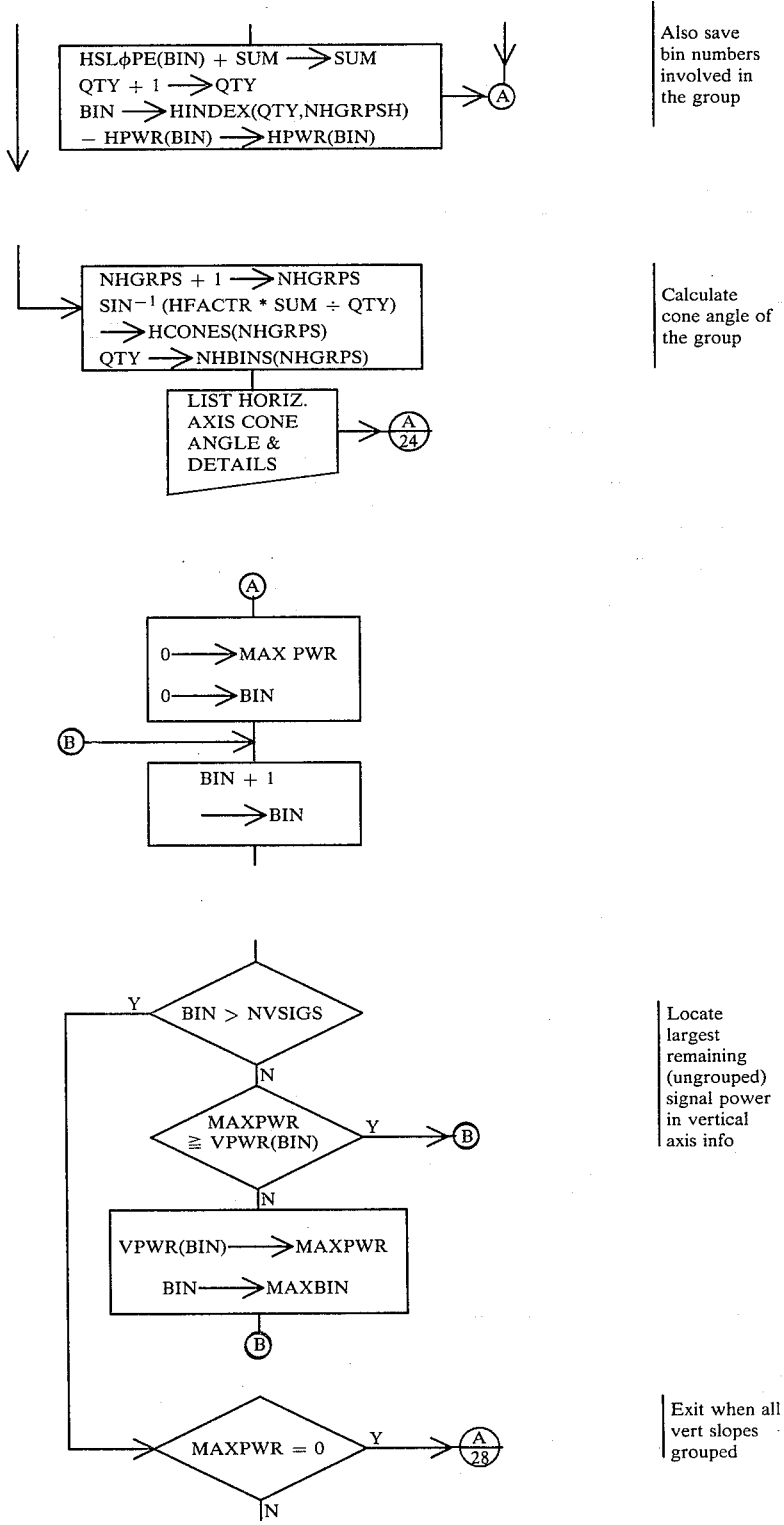

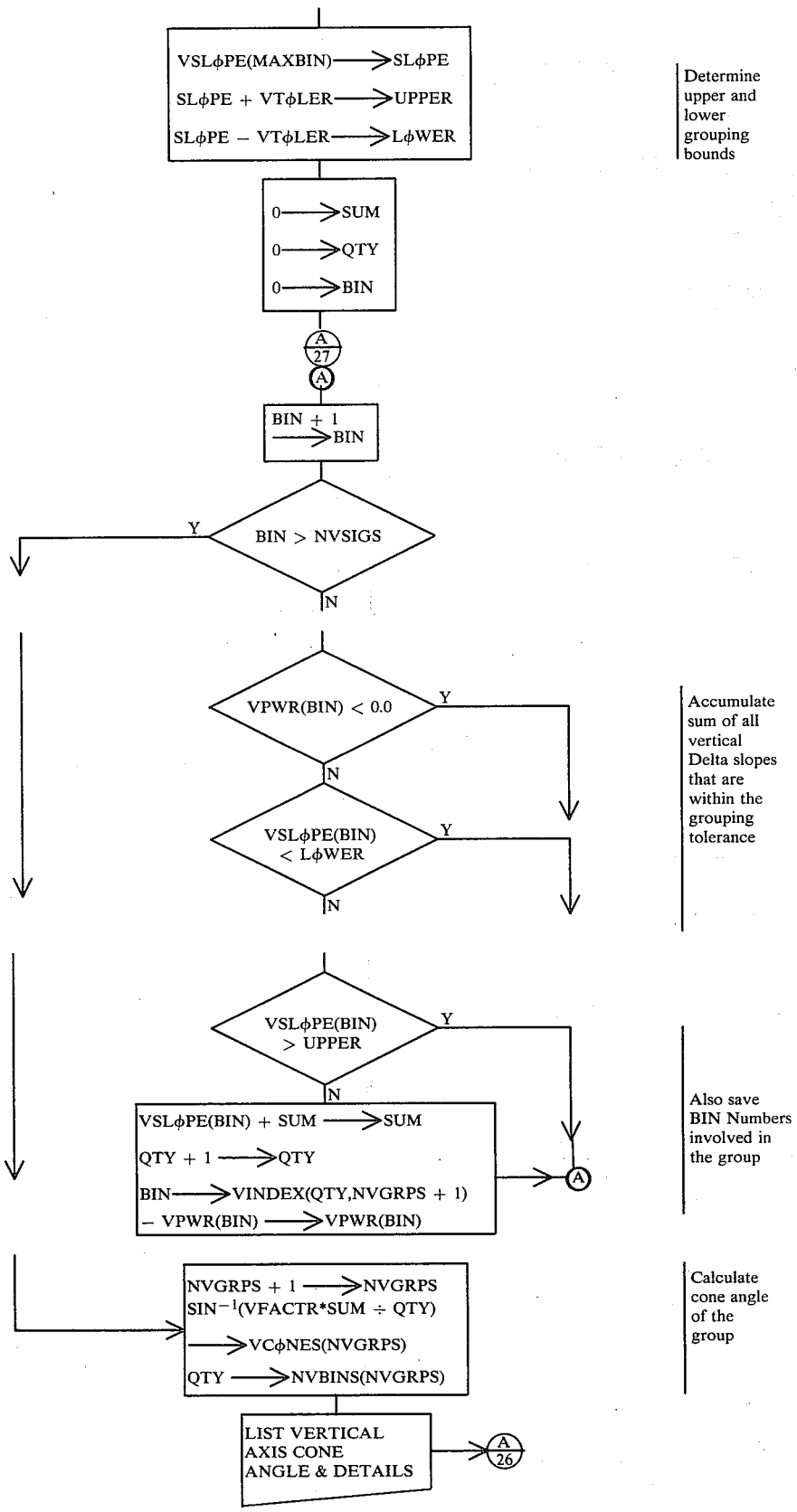

-continued
ALGORITHM
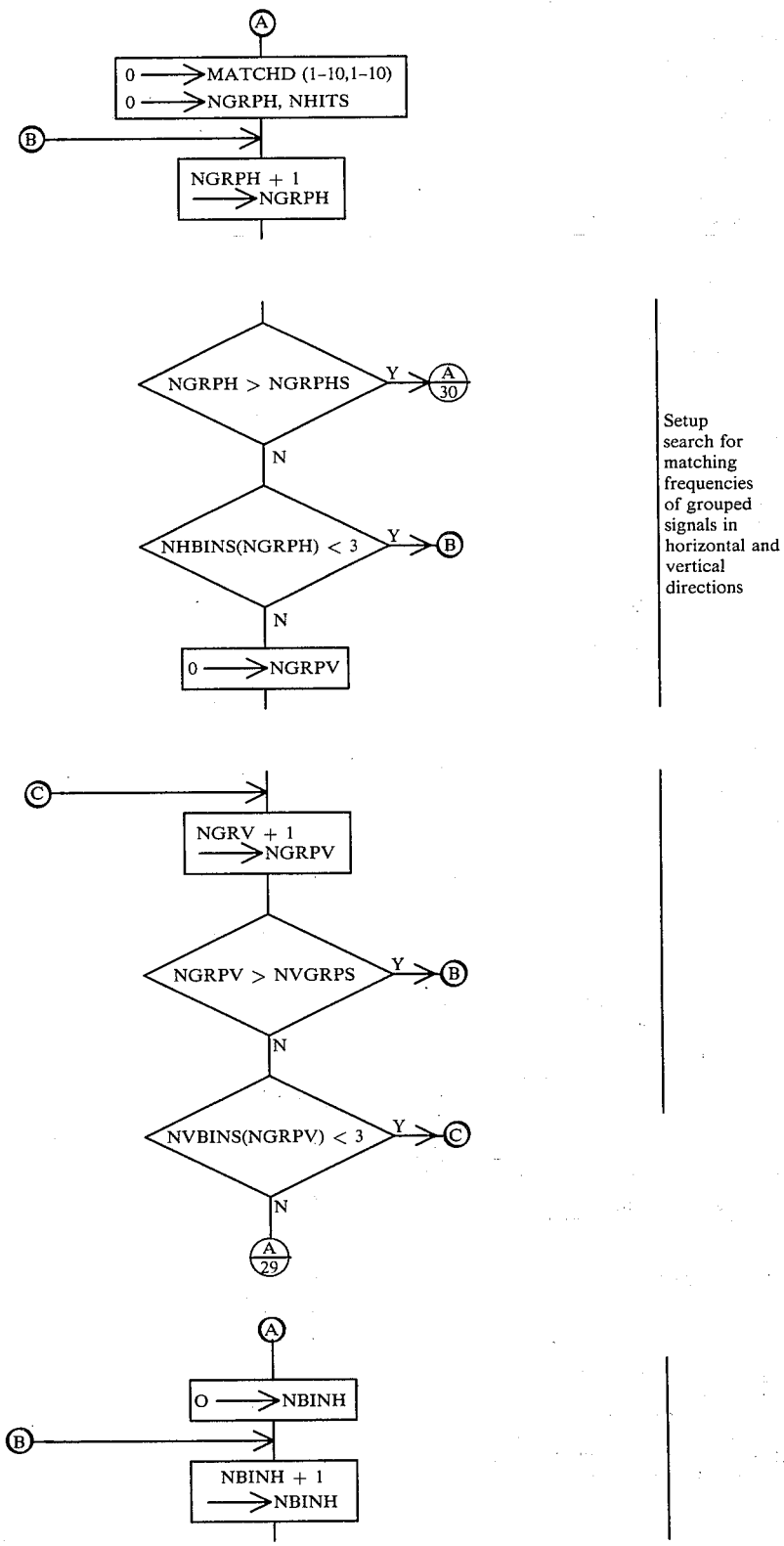
Setup search for matching frequencies of grouped signals in horizontal and vertical directions

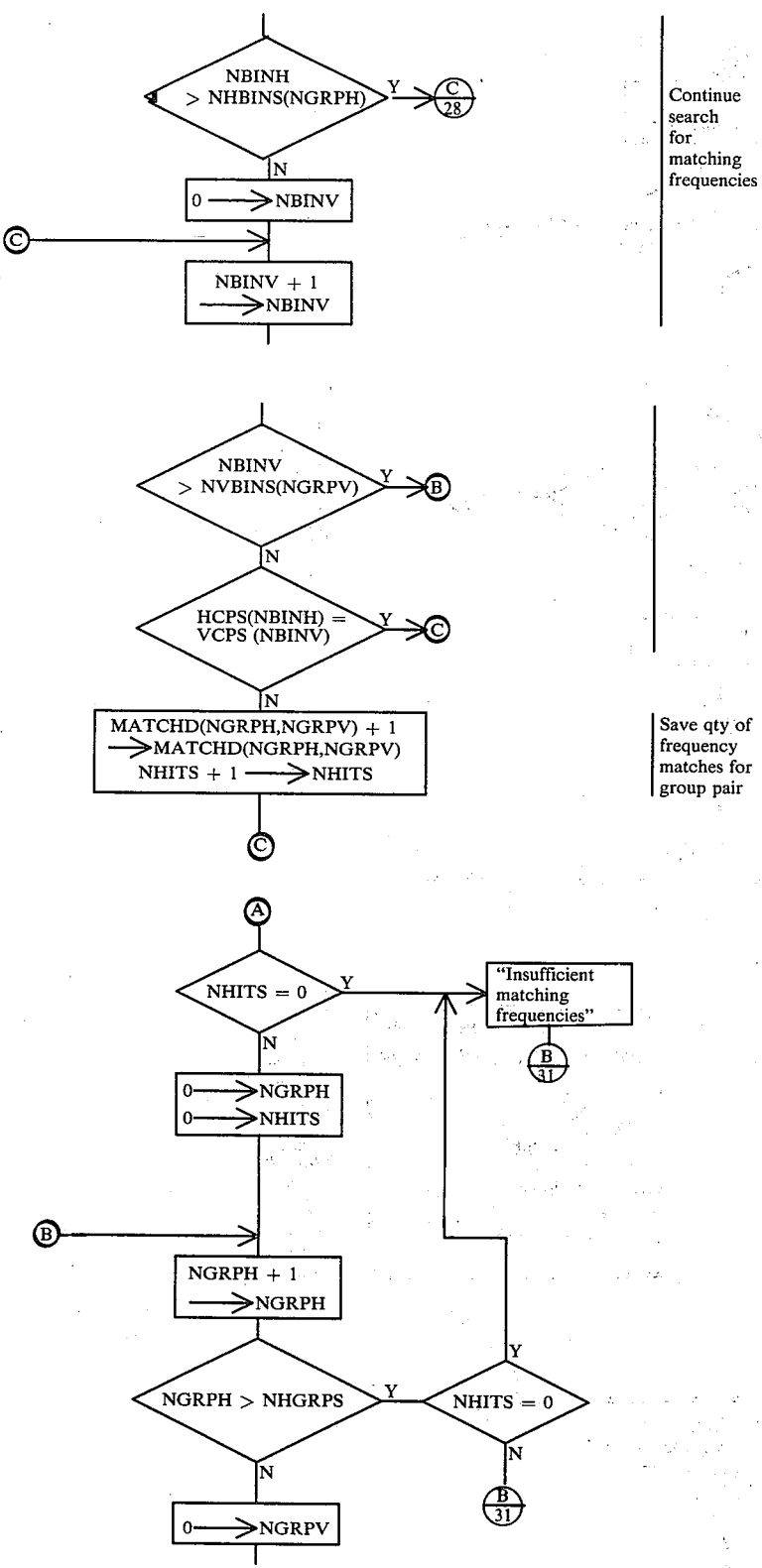

-continued
ALGORITHM
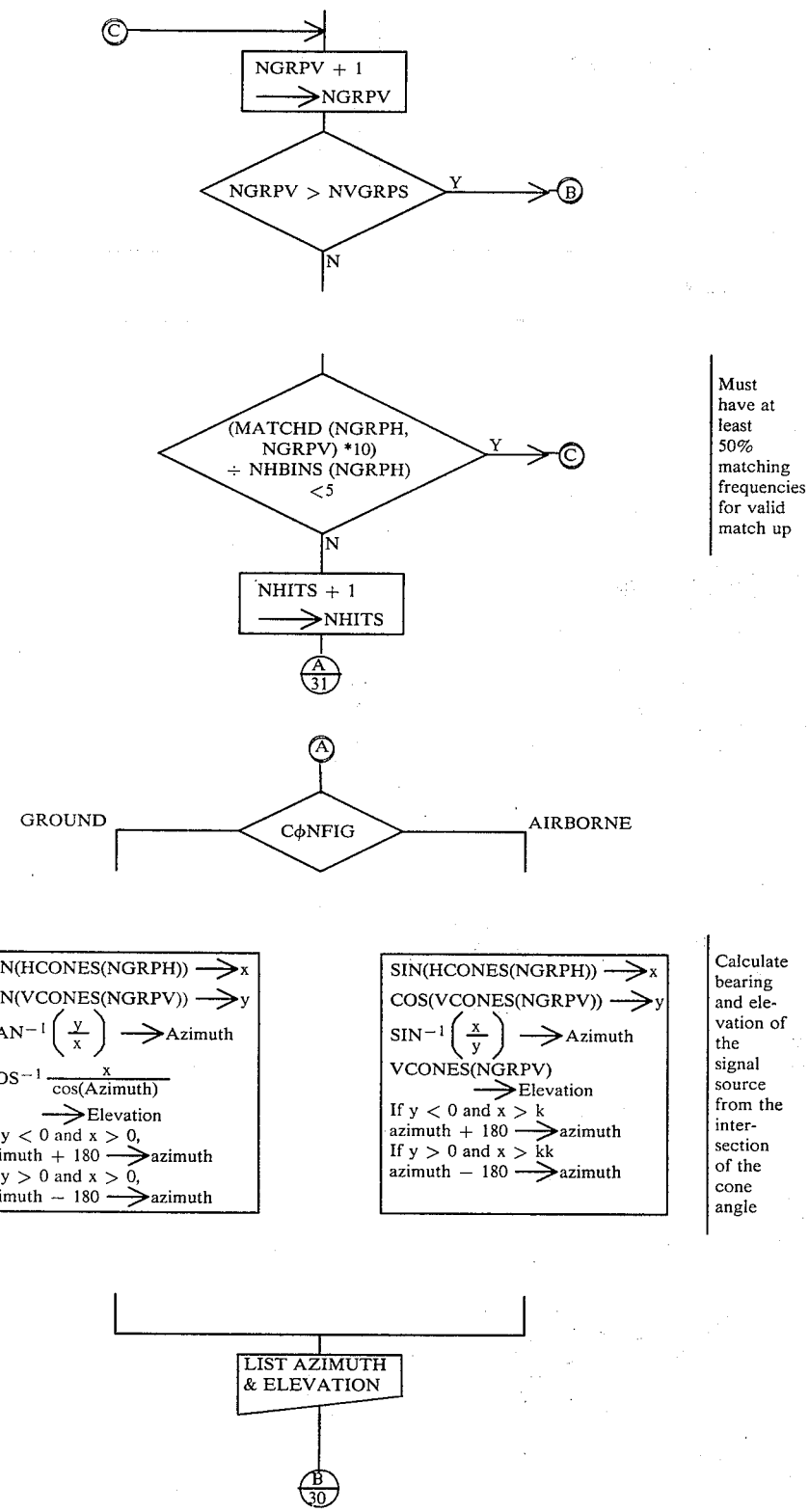

-continued
ALGORITHM

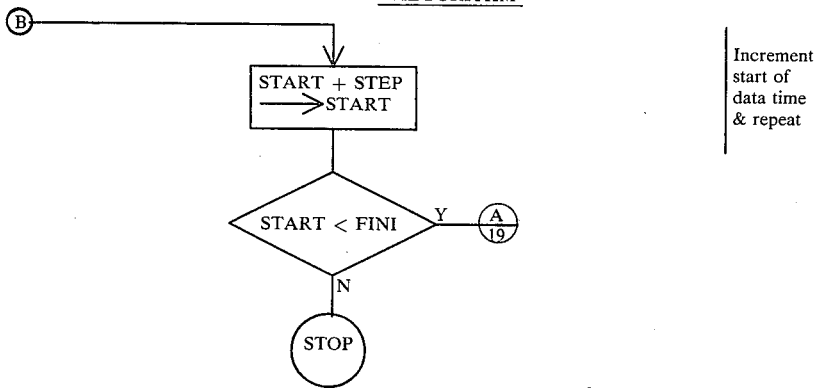

We claim:
1. An acoustical detection system for detecting targets which generate acoustical signals comprising:
   at least one pair of acoustical transducer means for receiving acoustical signals from said targets and transducing said acoustical signals to electrical signals having a plurality of frequency bins, said transducer means being spaced from each other,
   means for converting said electrical signals from analog signals to digital signals,
   means for processing said digital signals to generate phase difference signals in accordance with the phase differences between each of the frequency bins of the signals received by said pair of transducer means,
   means for dividing each of said phase difference signals by a signal in accordance with the frequency of the frequency bin associated therewith to generate phase difference slope signals for each of said frequency bins,
   means for grouping together signals representing common phase difference slopes, the signals in each such grouping representing signals emanating from a common target, and
   means for processing each of the groupings of signals to determine the direction and identity of each of the targets.

2. The detection system of claim 1 wherein the transducer means are microphones.

3. The detection system of claim 1 wherein there are two pairs of said transducer means, one of said pairs being oriented in a substantially horizontal plane for use in determining target azimuth, the other of said pairs being oriented in a substantially vertical plane for use in determining target elevation.

4. The detection system of claim 3 wherein said processing means operates to generate phase difference signals for each of the frequency bins for the signals received by each of said pairs of transducer means.

5. The detection system of claim 1 wherein said means for converting said electrical signals to digital signals comprises sampling means for sequentially sampling said analog signals, means for time multiplexing the signals sampled from each of the transducer means and means for converting the multiplexed signals to binary digital form.

6. The detection system of claim 1 wherein said means for processing the digital signals to generate phase difference signals includes fast Fourier transformer means for converting said digital signals to real and imaginary Fourier coefficients.

7. The detection system of claim 1 and further including filter means for filtering out high and low frequency components from the outputs of said transducer means.

8. The detection system of claim 1 and further including means for converting the outputs of said transducer means to unipolar form.

9. The detection system of claim 1 and further including means for Hamming function weighting the outputs of said transducer means.

10. The detection system of claim 1 wherein is further included means for eliminating signals having power levels above a first predetermined level and below a second predetermined level.

11. A method for detecting targets which generate acoustical signals comprising the steps of:
   receiving said acoustical signals with a pair of microphones spaced a predetermined distance from each other,
   from the outputs of said microphones, computing signals in accordance with the phase for each frequency bin of the signals received by said microphones,
   computing the phase differences between the signals in accordance with phase from the pair of microphones for each frequency bin,
   dividing each of said computed phase differences by a signal in accordance with the frequency of the associated frequency bin to provide phase difference slope signals,
   grouping together phase difference slope signals having common values, whereby each of the grouped signals represents signals emanating from a common target, and
   processing each of the grouped signals to compute target direction from the value of the phase difference slope and target identity from the frequency composition of the grouped signals.

12. The method of claim 11 wherein the acoustical signals are received by first and second pairs of microphones, said first pair being spaced from each other and oriented in a substantially horizontal plane, said second pair being spaced from each other and oriented in a substantially vertical plane.

13. The method of claim 12 wherein the outputs of the microphones are converted to binary digital signals and the binary digital signals fast Fourier transformed to Fourier real and imaginary coefficients prior to the computation of the signals in accordance with phase for each frequency bin.

* * * * *